United States Patent
Yeh

(10) Patent No.: US 10,864,700 B2
(45) Date of Patent: Dec. 15, 2020

(54) FOAM PRODUCT

(71) Applicant: AGIT Global IP Holdings, LLC, Irvine, CA (US)

(72) Inventor: Tzong In Yeh, Fremont, CA (US)

(73) Assignee: AGIT GLOBAL IP HOLDINGS, LLC, Irvine, CA (US)

( * ) Notice: Subject to any disclaimer, the term of this patent is extended or adjusted under 35 U.S.C. 154(b) by 186 days.

(21) Appl. No.: 15/865,690

(22) Filed: Jan. 9, 2018

(65) Prior Publication Data

US 2019/0184674 A1 Jun. 20, 2019

(30) Foreign Application Priority Data

Dec. 14, 2017 (TW) .............................. 106143967 A

(51) Int. Cl.
*B32B 5/18* (2006.01)
*A63C 5/12* (2006.01)
(Continued)

(52) U.S. Cl.
CPC ................ *B32B 5/18* (2013.01); *A63C 5/126* (2013.01); *B32B 3/04* (2013.01); *B32B 3/08* (2013.01); *B32B 3/263* (2013.01); *B32B 3/30* (2013.01); *B32B 7/02* (2013.01); *B32B 27/065* (2013.01); *B32B 27/32* (2013.01); *B63B 32/57* (2020.02); *A63C 5/03* (2013.01); *A63C 5/12* (2013.01); *B32B 2266/025* (2013.01); *B32B 2266/0228* (2013.01); *B32B 2307/554* (2013.01); *B32B 2307/558* (2013.01); *B32B 2307/732* (2013.01); *B32B 2307/748* (2013.01); *B32B 2605/00* (2013.01)

(58) Field of Classification Search
CPC .................. B32B 5/18; B32B 2605/00; B32B 2266/0228; B32B 2266/025; B32B 2307/554; B32B 2307/558; B32B 2307/732; B32B 2307/748; B32B 7/02; B32B 27/065; B32B 27/32; B32B 3/04; B32B 3/08; B32B 3/263; B32B 3/30; B63B 35/7909; A63C 5/12; A63C 5/126; A63C 5/03
See application file for complete search history.

(56) References Cited

U.S. PATENT DOCUMENTS

| 2003/0224675 A1* | 12/2003 | Yeh ......................... A63C 5/03 441/65 |
| 2004/0176001 A1* | 9/2004 | Yeh ......................... A63C 5/03 441/74 |

(Continued)

FOREIGN PATENT DOCUMENTS

| FR | 2878817 A1 | 6/2006 | |
| WO | WO-2004101251 A1 * | 11/2004 | ........... B29C 44/569 |
| WO | WO2004101251 A1 | 11/2004 | |

*Primary Examiner* — Nathan L Van Sell
(74) *Attorney, Agent, or Firm* — Muncy, Geissler, Olds & Lowe, PC

(57) ABSTRACT

A foam product includes a foam core, an upper skin and a lower skin. The foam core has a top surface, a bottom surface, and a peripheral side surface. The upper skin covers both of the top surface and the peripheral side surface of the foam core, but extending not beyond the bottom surface of the foam core. And, the lower skin covers both of the bottom surface of the foam core and a peripheral end surface of the upper skin.

11 Claims, 4 Drawing Sheets

(51) Int. Cl.
*B32B 7/02* (2019.01)
*B32B 3/30* (2006.01)
*B32B 3/04* (2006.01)
*B32B 27/32* (2006.01)
*B32B 27/06* (2006.01)
*B32B 3/08* (2006.01)
*B32B 3/26* (2006.01)
*B63B 32/57* (2020.01)
*A63C 5/03* (2006.01)

(56) References Cited

U.S. PATENT DOCUMENTS

| | | | |
|---|---|---|---|
| 2005/0276966 A1* | 12/2005 | Cheung | A63C 5/12 428/314.8 |
| 2006/0186640 A1* | 8/2006 | Cheung | A63C 5/12 280/610 |
| 2006/0286879 A1* | 12/2006 | Lin | B63B 1/042 441/65 |
| 2007/0015421 A1* | 1/2007 | Yeh | A63C 5/03 441/65 |
| 2007/0160798 A1* | 7/2007 | Yeh | B29C 44/129 428/71 |
| 2008/0146101 A1* | 6/2008 | Yeh | B32B 5/32 441/65 |
| 2008/0166539 A1* | 7/2008 | Yeh | B29C 70/086 428/306.6 |
| 2008/0242169 A1* | 10/2008 | Yeh | A63C 5/03 441/65 |
| 2008/0286543 A1* | 11/2008 | Metrot | B32B 5/18 428/213 |
| 2009/0149094 A1* | 6/2009 | Yeh | A63C 5/03 441/65 |
| 2010/0048070 A1* | 2/2010 | Yeh | A63C 5/0417 441/65 |
| 2010/0129590 A1* | 5/2010 | Yeh | B32B 5/32 428/71 |
| 2012/0196104 A1* | 8/2012 | Yeh | B32B 27/065 428/215 |
| 2013/0015628 A1* | 1/2013 | Lin | B62B 13/06 280/18 |

* cited by examiner

FOAM PRODUCT

BACKGROUND OF THE INVENTION

1. Field of the Invention

The present invention relates to a foam product such as surfboard, snow board, grass board, sand board, or rescue board, and more particularly to a foam product of a multi-layered structure.

2. Description of the Related Art

In FIGS. 8 to 10, there is shown a conventional foam product which includes a foam core 8, an upper skin 9 and a lower skin 7. The foam core 8 is formed of an expanded material, such as EPS (expanded polystyrene). The upper skin 9 may be formed of single or multi-layers. As show in FIG. 9, the upper skin 9 has two layers, in which one is a foam layer 90 while the other is a plastic film 91 with a pattern printed thereon. Likewise, the lower skin 7 may be formed of single or multi-layers. The lower skin 7 also has two layers. One is a foam layer 70 while the other is a plastic plate 71. It is noted that in this conventional foam product, the foam layer 70 is thicker than the plastic plate 71. The plastic plate 71 has a bottom surface 710 that contacts a slide surface, such as the surface of water, snow, grass or sand, while sliding. The lower skin 7 covers and is bonded to the whole bottom surface 80 of the foam core 8, but does not laterally extend beyond the bottom surface 80. On the other side, the upper skin 9 not only covers and is bonded to both the upper surface 81 and the peripheral side surface 82 of the foam core 8, but also extends to cover a peripheral end surface 700 of the lower skin 7. Thus, a seam S is formed at the junction between the peripheral end surface 700 of the lower skin 7 and the extension of the upper skin 9. That is, the seam S is formed between the upper skin 9 and the lower skin 7 at the bottom surface of the conventional foam product, and surrounds the outer surface 710 of the lower skin 7, as shown in FIG. 10. Furthermore, as shown in FIG. 9, the seam S extends upward to the junction between the foam core 8 and the upper skin 9.

When a user rides the foam product on the slide surface, the outer surface 710 of the lower skin 7 is not the only one that contacts with the slide surface. The peripheral end portion 900 of the upper skin 7 and the seam S, unfortunately, will contact with the slide surface, and therefore be subject to abrasion and impact from the slide surface, which may cause a split at the seam S in a short period of time. And once the split occurs, water, sand or other substances on the sliding surface may penetrate the foam core 8, and thus expedite the peeling of the upper skin 7 from the foam core 8. Consequently, a need exists for a foam product which overcomes the aforementioned problem in the prior art without unduly reducing the quality of the foam product.

SUMMARY OF THE INVENTION

Accordingly, it is an object of the present invention to provide a foam product to satisfy the aforementioned need.

In one embodiment, the foam product of this invention includes a foam core, an upper skin and an lower skin. The foam core has a top surface, a bottom surface and a peripheral side surface. The upper skin covers both of the top surface and the peripheral side surface of the foam core, but extending not beyond the bottom surface of the foam core, wherein the upper skin has an inner surface bonded to the top surface and the peripheral side surface of the foam core, an outer surface provided for supporting a user, and a peripheral end surface. On the other hand, the lower skin covers the bottom surface of the foam core and at least a portion of the peripheral end surface of the upper skin, and has an inner surface, an outer surface, and a peripheral end surface, wherein the inner surface of the lower skin is bonded to the bottom surface of the foam core and the peripheral end surface of the upper skin, and the outer surface of the lower skin is provided for contacting a slide surface.

In another embodiment, the foam product includes a foam core, an upper skin and a lower skin. The foam core has a top surface, a bottom surface and a peripheral side surface. The upper skin covers both of the top surface of the foam core and an upper area of the peripheral side surface of the foam core, and has an inner surface and an outer surface, wherein the outer surface of the upper skin is provided for supporting a user, and the inner surface of the upper skin is bonded to the top surface and the upper area of the peripheral side surface of the foam core. On the other hand, the lower skin covering both of the bottom surface and a lower area of the peripheral side surface of the foam core, and has an inner surface and an outer surface, wherein the inner surface of the lower skin is bonded to the bottom surface and the lower area of the peripheral side surface of the foam core; and the upper and lower skins are partly overlapped at the peripheral side surface of the foam core.

As described above, the upper skin of the foam product covers the top surface of the foam core as well as the peripheral side surface of the foam core, but extends not beyond the bottom surface of the foam core. On the other hand, the lower skin covers the bottom surface of the foam core, and extends laterally to cover the peripheral end surface of the upper skin. Thus, no seam is formed on bottom of the foam product, thereby avoiding any split from the bottom of the foam product. In fact, the peripheral end surface of the upper skin is covered by the lower skin, and is well protected from any abrasion and impact from the slide surface, thereby greatly reducing the chance of the peeling of the upper skin from the foam core.

The foregoing and other objectives, features, and advantages of the invention will be more readily understood upon consideration of the following detailed description of the invention, taken in conjunction with the accompanying drawings.

DETAILED DESCRIPTION OF EMBODIMENTS

Figure 1:
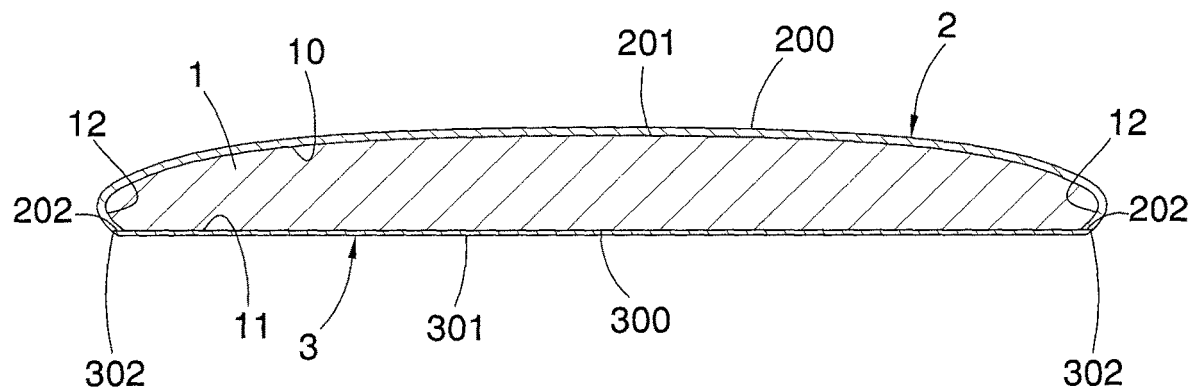
FIG. 1 is a cross-sectional view of a foam product in accordance with a first embodiment of the present invention.
Figure 2:
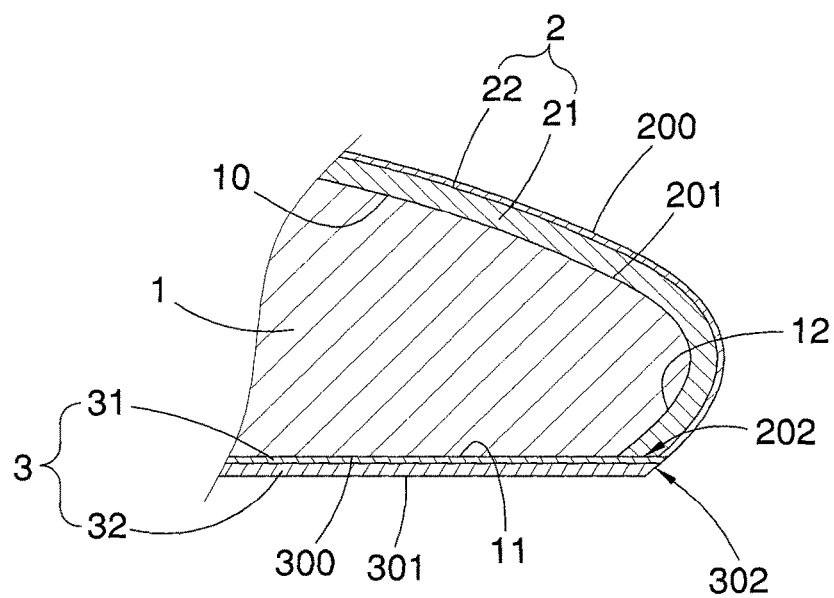
FIG. 2 is a partial enlarged cross-sectional view of the foam product shown in FIG. 1.
Figure 3:
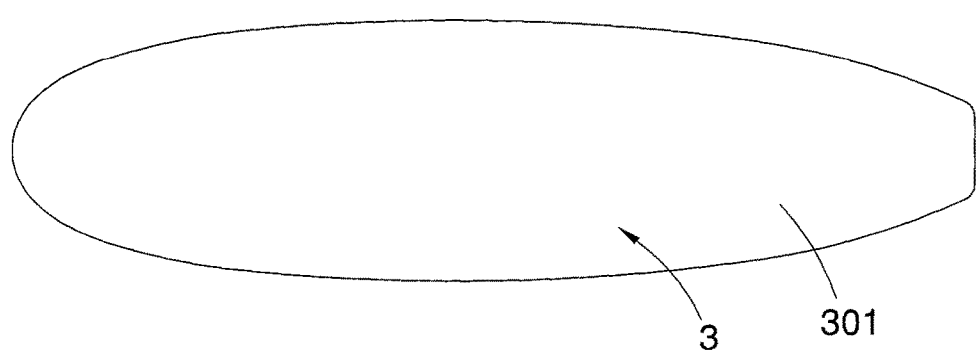
FIG. 3 is a bottom view of the foam product shown in FIG. 1.

Referring to FIGS. 1 to 3, there is shown a first embodiment of the foam product, which maybe a recreational sports board (such as surfboard, snowboard, grass board, or sand board), or a rescue board (such as floating board, kickboard, or floating beacon).

As shown in FIG. 1, the foam product includes a foam core 1, an upper skin 2 and a lower skin 3. The foam core 1 has a top surface 10, a bottom surface 11 and a peripheral side surface 12 connecting the top surface 10 and the bottom surface 11. The foam core 1 may be formed of single or multi-layers, and made of a molded expanded plastic material, such as expanded polystyrene (EPS), expanded polyethylene (EPE), expanded polypropylene (EPP) or expanded copolymer of styrene and ethylene. The upper skin 2 and the lower skin 3 are made of plastics, and both are thinner than the foam core 1. Each of the upper skin 2 and the lower skin 3 may also be formed of single or multi-layers.

As shown in FIGS. 1 and 2, the upper skin 2 covers not only the top surface 10 of the foam core 1 but also the peripheral side surface 12 of the foam core 1, but extends not beyond the bottom surface 11 of the foam core 1.

More specifically, the upper skin 2 has an outer surface 200, an inner surface 201, and a peripheral end surface 202 connecting the outer surface 200 and the inner surface 201. The outer surface 200 of the upper skin 2 is provided for supporting a user. The inner surface 201 of the upper skin 2 is bonded to the top surface 10 and the peripheral side surface 12 of the foam core 1. In this embodiment, the upper skin 2 includes an upper foam layer 21 and a plastic film 22. The upper foam layer 21 is disposed in between the foam core 1 and the plastic film 22, and is made of expanded plastic materials, such as EPE or EPP, with a thickness of about 2 to 4 mm. The plastic film 22 is a non-foam plastic film and may be made of polyethylene with a thickness of about 0.1 to 0.2 mm. Preferably, a pattern (not shown) is printed on the plastic film 22.

The lower skin 3 covers both of the bottom surface 11 of the foam core 1 and the whole peripheral end surface 202 of the upper skin 2.

More specifically, the lower skin 3 has an inner surface 300, an outer surface 301, and a peripheral end surface 302 connecting the inner surface 300 and the outer surface 301. The inner surface 300 of the lower skin 3 is bonded to the bottom surface 11 of the foam core 1 and the peripheral end surface 202 of the upper skin 2. The outer surface 301 of the lower skin 3 is provided for contacting a slide surface, such as a surface of water, snow, grass or sand. In this embodiment, the lower skin 3 includes a lower foam layer 31 and a plastic plate 32. The lower foam layer 31 is disposed in between the foam core 1 and the plastic plate 32, and may be made of an expanded plastic material, such as EPE or EPP. The plastic plate 32 is a non-foam plastic plate and may be made of polyethylene with a thickness of about 0.6 to 0.8 mm. A pattern may also be printed on the plastic plate 32. In particular, the plastic plate 32 is relatively made tougher and more wear resistant than the lower foam layer 31, and thus is more suitable for sliding on the slide surface. In addition, the plastic plate 32 of the lower skin 3 is thicker than the plastic film 21 of the upper skin 2, but is thinner than the upper foam layer 22 of the upper skin 2.

Since the lower skin 3 extends laterally beyond the bottom surface 11 of the foam core to cover the whole peripheral end surface 202 of the upper skin, there is no seam formed or exposed on the bottom surface of the foam product. In this manner, when an user rides the foam product upon the slide surface, no seam will contact with the slide surface. Thus, unlike the split or peeling of the upper skin 9 occurs at the seam in the prior art, no peeling of the upper skin 2 from the foam core 1 will occur in this invention. In this embodiment, the whole peripheral end surface 202 of the upper skin 2 is covered by the inner surface 300 of the lower skin 3 so that when the user rides the foam product upon the slide surface, the peripheral end surface 202 of the upper skin 2 would not contact with the slide surface, thereby avoiding the peripheral end surface 202 of the upper skin 2 from abrasion and impact by the slide surface, and greatly reducing the chance of peeling of the upper skin 2 from the foam core 1.

It is noted that, before the lower skin 3 is bonded to the bottom surface 11 of the foam core 1, the lower foam layer 31 of the lower skin 3 is generally identical in thickness to the upper foam layer 21 of the upper skin 2; however, when the lower skin 3 is bonded onto the foam core 1, the lower foam layer 31 of the lower skin 3 is heavily compressed and therefore becomes thinner with a thickness of about 0.3 to 0.5 mm. As a result, in the foam product, the lower foam layer 31 of the lower skin 3 is actually thinner than the upper foam layer 21 of the upper skin 2, and is even thinner than the plastic plate 32 of the lower skin 3, as shown in FIG. 2. The lower foam layer 31 of the lower skin is so thin that it can hardly be noticed when viewed from a side.

Figure 4:
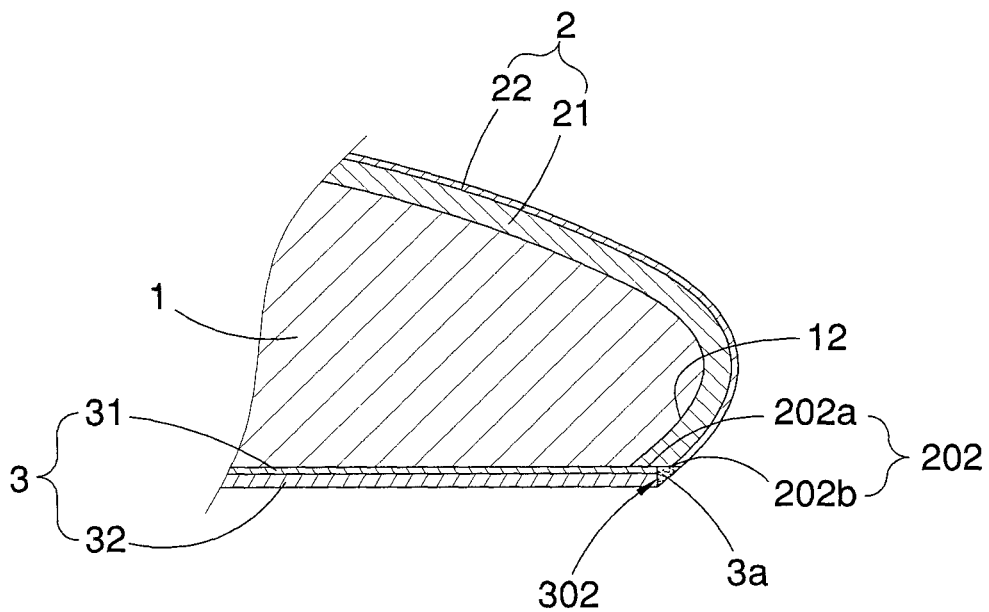
FIG. 4 is a partial cross-sectional view of a foam product in accordance with a second embodiment of the present invention.

FIG. 4 illustrates a second embodiment of the foam product, which is substantially identical to that of the first embodiment, except that the lower skin 3 of the second embodiment covers only a portion 202a of the peripheral end surface 202 of the upper skin 2. The rest portion 202b of peripheral end surface 202 of the upper skin 2 is uncovered. Thus, a gap is formed in between the peripheral end surface 302 of the lower skin 3 and the rest portion 202b of the peripheral end surface 202 of the upper skin 2, and is filled with a sealing material, such as epoxy, to form an annular sealing member 3a. In this manner, the upper foam layer 21 of the upper skin 2 and the lower foam layer 31 of the lower skin 3 are both hidden inside the foam product and protected from exposure to outside environment.

Figure 5:
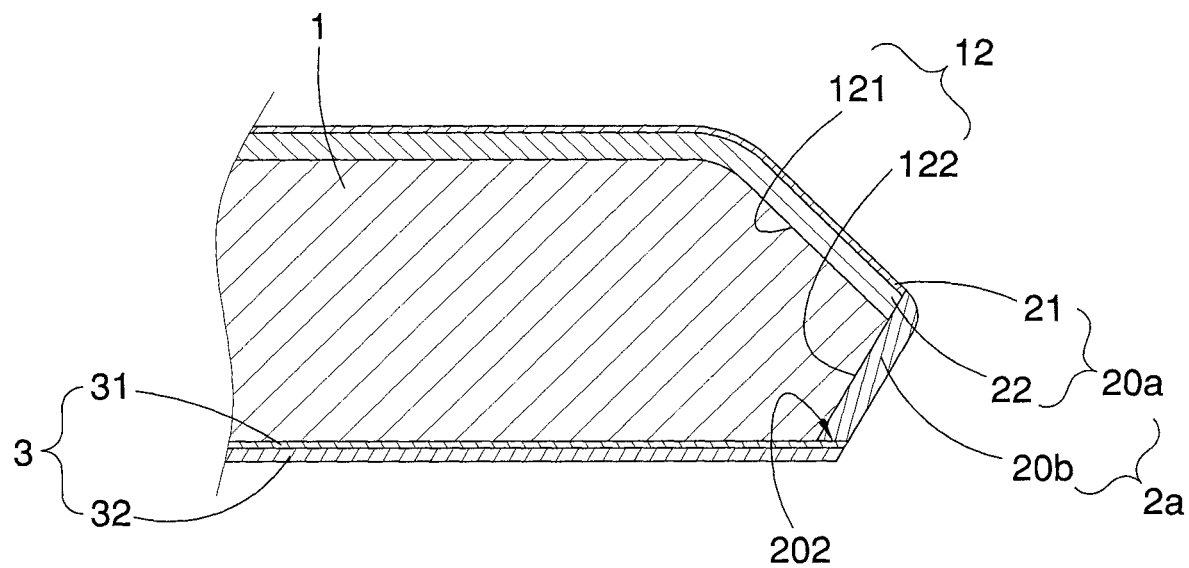
FIG. 5 is a partial cross-sectional view of a foam product in accordance with a third embodiment of the present invention.

FIG. 5 illustrates a third embodiment of the foam product, which is substantially identical to that of the aforementioned embodiment(s), except that the upper skin 2a of the third embodiment is formed in two or more parts. In this embodiment, the upper skin 2a includes a primary skin portion 20a and at least one lateral skin portion 20b. The primary skin portion 20a covers and is bonded to the top surface 10 of the foam core 1 as well as an upper area 121 of the peripheral side surface 12 of the foam core 1. The lateral skin portion 20b covers and is bonded to a lower area 122 of the peripheral side surface 12 of the foam core 1. The lateral skin portion 20b may be made of plastic and be single or multi-layers. In this embodiment, the lateral skin portion 20b is formed of one single layer and made of an expanded plastic material, such as EPE or EPP. Because of the covering of the lower skin 3 over the peripheral end surface 202 of the upper skin 2a, there is no seam formed at the bottom surface of the foam product of the third embodiment, thereby avoiding the bottom surface of the foam product from splitting or peeling as occurred in the prior art. Besides, the whole peripheral end surface 202 of the upper skin 2a is covered and protected by the lower skin 3 from abrasion or impact by the slide surface, thereby avoiding the peeling of the lateral skin portion 20b of the upper skin 2a from the foam core 1.

Figure 6:
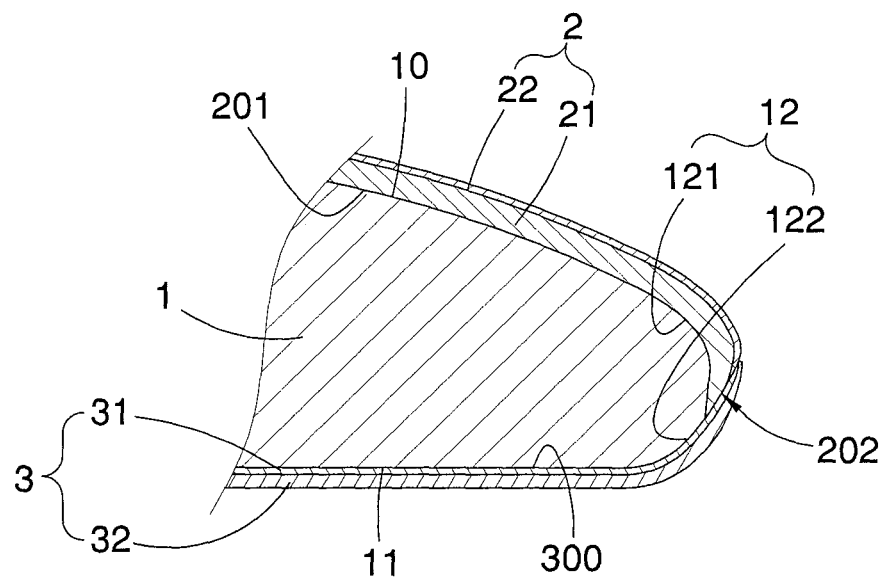
FIG. 6 is a partial cross-sectional view of a foam product in accordance with a fourth embodiment of the present invention.

FIG. 6 illustrates a fourth embodiment of the foam product, which is substantially identical to that of the aforementioned embodiment(s), except that the upper skin 2 covers the top surface of the foam core and extends to cover an upper area 121 of the peripheral side surface 12 of the foam core 1. The lower skin 3 covers the bottom surface 11 of the foam core 1 and extends to cover an lower area 122 of the peripheral side surface 12 of the foam core 1. In particular, the lower skin 3 is partly laid upon the upper skin 2, as shown in FIG. 6. Alternatively, in other examples, the upper skin 2 may be partly laid on top of the lower skin 3. Either way, the upper and lower skins 2, 3 are partly overlaid with one another at the peripheral side surface 12 of the foam core 1. As such, there is no seam formed at the bottom surface of the foam product, thereby avoiding the bottom surface of the foam product from splitting or peeling as occurred in the prior art. Besides, the peripheral end surface 202 of the upper skin 2 is completely covered and protected by the lower skin 3 from abrasion or impact by the slide surface, thereby avoiding the peeling of the upper skin 2 from the foam core 1.

Figure 7:
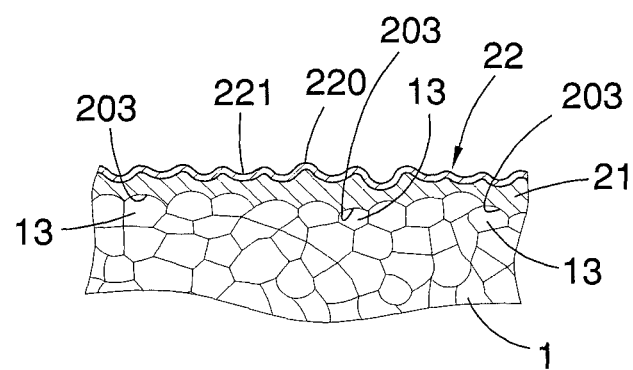
FIG. 7 is a partial enlarged cross-sectional view of the foam product shown in FIG. 6.
Figure 8:
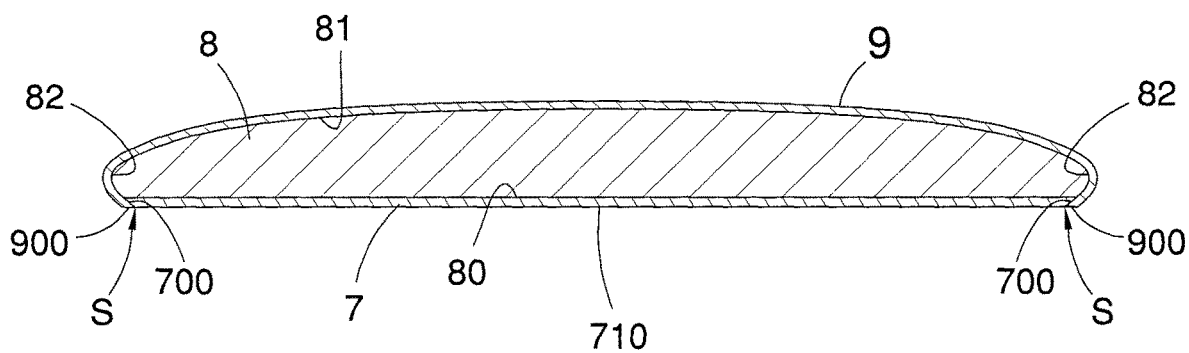
FIG. 8 is a cross-sectional view of a conventional foam product.
Figure 9:
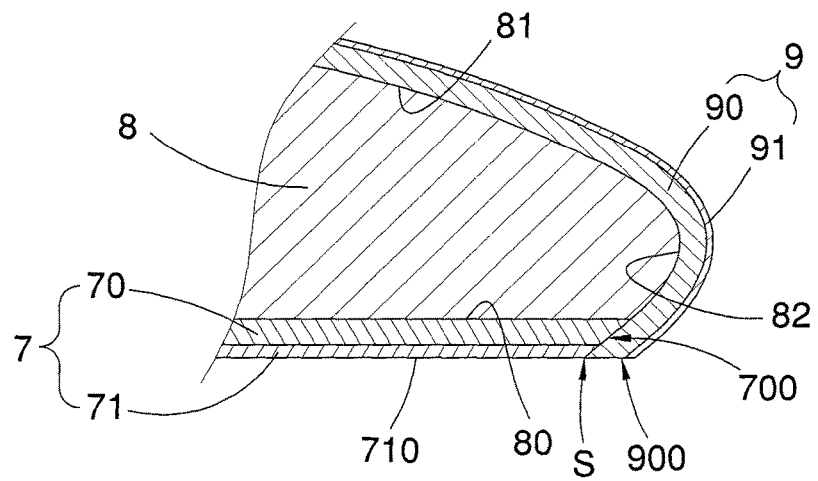
FIG. 9 is a partial enlarged cross-sectional view of the foam product shown in FIG. 8.
Figure 10:
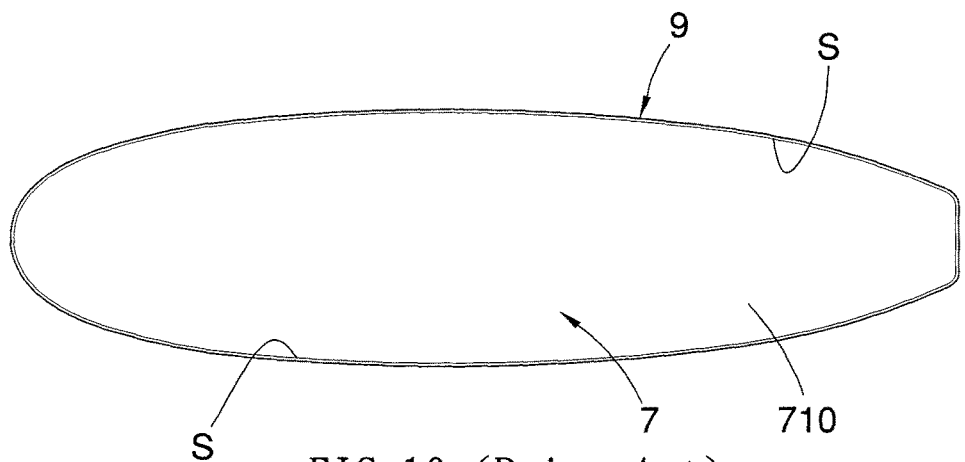
FIG. 10 is a bottom view of the foam product shown in FIG. 8.

As shown in FIG. 6, the upper skin 2 has an end portion overlapped with the lower skin 3, and the lower skin 3 has an end portion overlapped with the upper skin 2. The end portion of the upper skin 2 is thinner than the rest portion of the upper skin 2, and the end portion of the lower skin 3 is thinner than the rest portion of the lower skin 3. Furthermore, as shown in FIG. 7, the upper foam layer 21 of the upper skin 2 is formed on its outer surface a plurality of protrusions 220 and concaves 221 staggered from one another, except that the overlapped, end portion of the upper skin 2 is substantially flat and smooth, as depicted in FIG. 6.

Referring again to FIG. 7, the foam core 1 is made of EPS or EPP. The upper foam layer 21 of the upper skin 2 is formed in its inner surface with a plurality of concave dents 203 adjoined to one another. The foam core 1 is formed on its upper surface with a plurality of convex bumps 13. The convex bumps 13 of the foam core 1 are respectively bonded in the concave dents 203 of the upper foam layer 21 of the upper skin 2. Referring back to FIG. 6, the bottom surface 11 of the foam core 1 is relatively flat than the top surface 10 of the foam core 1, and the inner surface 300 of the lower skin 3 is relative flat than the inner surface 201 of the upper skin 2.

As described above, this invention provides a foam product in which the upper skin covers the top surface of the foam core as well as the peripheral side surface of the foam core, but extends not beyond the bottom surface of the foam core. The lower skin, on the other hand, covers the bottom surface of the foam core, and extends outside to cover the peripheral end surface of the upper skin. This creates no seam on the bottom surface of the foam product, thereby avoiding splitting or peeling of the upper skin from the foam core. Rather, the peripheral end surface of the upper skin is covered by the lower skin, and is protected from any abrasion and impact by the slide surface, thereby greatly reducing the chance of peeling of the upper skin from the foam core.

It should be evident that this disclosure is by way of example and that various changes may be made by adding, modifying or eliminating details without departing from the fair scope of the teaching contained in this disclosure.

What is claimed is:

1. A foam product, comprising:
   a foam core having a top surface, a bottom surface and a peripheral side surface;
   an upper foam layer covering the top surface of the foam core and at least a portion of the peripheral side surface of the foam core, but extending not beyond the bottom surface of the foam core, wherein the upper foam layer has an inner surface bonded to the top surface and the peripheral side surface of the foam core, an outer surface, and a peripheral end surface; and
   a compressed lower foam layer made of EPE or EPP and covering both of the bottom surface of the foam core and the peripheral end surface of the upper foam layer, and having an inner surface, an outer surface, and a peripheral end surface, wherein the inner surface of the compressed lower foam layer is bonded to the bottom surface of the foam core and the peripheral end surface of the upper foam layer;
   a non-foam plastic plate made of polyethylene and covering the outer surface of the compressed lower foam layer so that the compressed lower foam layer is disposed in between the foam core and the non-foam plastic plate, wherein the compressed lower foam layer is compressed and therefore having a thickness smaller than each of the non-foam plastic plate and the upper foam layer.

2. The foam product as recited in claim 1, wherein the compressed lower foam layer covers the whole peripheral end surface of the upper foam layer.

3. The foam product as recited in claim 1, further comprising a sealing member, wherein the peripheral end surface of the upper foam layer is partly covered by the compressed lower foam layer, and the sealing member is filled in a gap between the peripheral end surface of the compressed lower foam layer and an uncovered portion of the peripheral end surface of the upper foam layer, wherein the peripheral end surface of the compressed lower foam layer has no contact with the uncovered portion of the peripheral end surface of the upper foam layer so that the gap is formed between the peripheral end surface and the uncovered portion.

4. The foam product as recited in claim 1, further comprising a plastic film covering the outer surface of the upper foam layer so that the upper foam layer is disposed in between the foam core and the plastic film, wherein the upper foam layer has in its inner surface a plurality of concave dents adjoined to one another; the foam core has on its top surface a plurality of convex bumps adjoined to one another; and each of the convex bumps of the foam core is bonded in a respective one of the concave dents of the upper foam layer.

5. The foam product as recited in claim 4, wherein the bottom surface of the foam core is relatively flatter than the top surface of the foam core, and the inner surface of the compressed lower foam layer is relative flatter than the inner surface of the upper foam layer.

6. A foam product, comprising:
   a foam core having a top surface, a bottom surface and a peripheral side surface;
   an upper foam layer covering both of the top surface and an upper area of the peripheral side surface of the foam core, and having an inner surface and an outer surface, wherein the inner surface of the upper foam layer is bonded to the top surface and the upper area of the peripheral side surface of the foam core; and
   a compressed lower foam layer made of EPE or EPP and covering both of the bottom surface of the foam core and a lower area of the peripheral side surface of the foam core, and having an inner surface and an outer surface, wherein the inner surface of the compressed lower foam layer is bonded to the bottom surface and the lower area of the peripheral side surface of the foam core; and the upper and compressed lower foam layers are partly overlapped at the peripheral side surface of the foam core; and a non-foam plastic plate made of polyethylene and covering the outer surface of the compressed lower foam layer so that the compressed lower foam layer is disposed in between the foam core and the non-foam plastic plate, wherein the compressed lower foam layer is compressed and therefore having a thickness smaller than each of the non-foam plastic plate and the upper foam layer.

7. The foam product as recited in claim 6, wherein the compressed lower foam layer is laid on top of the upper foam layer.

8. The foam product as recited in claim 6, wherein the upper foam layer has an end portion overlapped with the compressed lower foam layer; the end portion of the upper foam layer is thinner than the rest portion of the upper foam layer; the compressed lower foam layer has an end portion overlapped with the upper foam layer; and the end portion of the compressed lower foam layer is thinner than the rest portion of the compressed lower foam layer.

9. The foam product as recited in claim 6, wherein the upper foam layer has an end portion overlapped with the compressed lower foam layer; the upper foam layer is formed on its outer surface a plurality of protrusions and concaves staggered from one another, except that the overlapped, end portion of the upper foam layer is substantially flat and smooth.

10. The foam product as recited in claim 6, further comprising a plastic film covering the outer surface of the upper foam layer so that the upper foam layer is disposed in between the foam core and the plastic film, wherein the upper foam layer has in its inner surface a plurality of concave dents adjoined to one another, the foam core has on its outer surface a plurality of convex bumps adjoined to one another, and each of the convex bumps of the foam core is bonded in a respective one of the concave dents of the upper foam layer.

11. The foam product as recited in claim 10, wherein the bottom surface of the foam core is relatively flatter than the top surface of the foam core; and the inner surface of the compressed lower foam layer is relative flatter than the inner surface of the upper foam layer.

* * * * *